(12) United States Patent
Hayber

(10) Patent No.: US 8,229,230 B2
(45) Date of Patent: Jul. 24, 2012

(54) METHOD OF DIGITAL IMAGE COMPARISON FOR IMAGING SOFTWARE DEVELOPMENT

(75) Inventor: Kenneth David Hayber, Fountain Valley, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 86 days.

(21) Appl. No.: 12/182,252

(22) Filed: Jul. 30, 2008

(65) Prior Publication Data

US 2010/0027893 A1 Feb. 4, 2010

(51) Int. Cl.
*G06K 9/68* (2006.01)

(52) U.S. Cl. ......... 382/218; 382/219; 382/220; 382/221

(58) Field of Classification Search ........... 382/218–221
See application file for complete search history.

(56) References Cited

U.S. PATENT DOCUMENTS

| | | | |
|---|---|---|---|
| 6,690,828 B2 | 2/2004 | Meyers | |
| 6,766,056 B1 | 7/2004 | Huang et al. | |
| 7,092,548 B2 | 8/2006 | Laumeyer et al. | |
| 2002/0146176 A1 | 10/2002 | Meyers | |
| 2003/0130968 A1 | 7/2003 | Kutsumi | |
| 2003/0174877 A1 | 9/2003 | Aiger | |
| 2004/0223648 A1* | 11/2004 | Hoene et al. | 382/218 |
| 2005/0188357 A1* | 8/2005 | Derks et al. | 717/124 |
| 2005/0240858 A1 | 10/2005 | Croft | |
| 2005/0262430 A1 | 11/2005 | Croft | |
| 2006/0159347 A1* | 7/2006 | Derks et al. | 382/218 |
| 2006/0242570 A1 | 10/2006 | Croft | |
| 2007/0146791 A1 | 6/2007 | Murase | |

* cited by examiner

*Primary Examiner* — Anand Bhatnagar
*Assistant Examiner* — Soo Park
(74) *Attorney, Agent, or Firm* — Chen Yoshimura LLP

(57) ABSTRACT

A method which uses digital image comparison for imaging software development is described. The software under development is used to generate a set of test digital images from print data. The images are stored. The software of a reference system is used to generate a set of reference digital images based on the same print data. The test and reference images are tiled, and image comparison is carried out on a tile-by-tile basis. A difference tile is generated for each test image tile and corresponding reference image tile, and the tiles are stored together in an image file to be displayed to the human user. The test images and reference images are compared using an image comparison program. The result of the comparison is presented to the human software developer for further comparison and evaluation.

18 Claims, 4 Drawing Sheets

A1    B1    X1

METHOD OF DIGITAL IMAGE COMPARISON FOR IMAGING SOFTWARE DEVELOPMENT

BACKGROUND OF THE INVENTION

1. Field of the Invention

This invention relates to a method useful in imaging software development, and in particular, it relates to a method of using digital image comparison in imaging software development.

2. Description of Related Art

When developing new software for imaging-relating devices, such as imaging software (e.g. raster image processor or RIP) for a printer, the output of the imaging software needs to be verified for image quality and accuracy. Conventionally, this process involves actually printing many (hundreds to thousands) of pages of images using the imaging software under development, and manually comparing these printed pages either to previously printed images (using existing reference software) or to original documents viewed on screen via software applications (e.g. Microsoft® Word, Adobe® Acrobat®, etc.). This process may need to be repeated many times during the development of a new device or software, or during the process of bug fixing or releasing updated (improved) software for an existing product.

This process can be very expensive in terms of human resources (time), equipment (often the printing device is also in development and either not available or is hand made and therefore very expensive), consumables (paper, toner).

SUMMARY

Accordingly, the present invention is directed to an automated method for performing image comparison during software development.

An object of the present invention is to provide an automated, cost effective method for evaluating images during development of imaging software.

While many digital image comparison methods exist, many are generally aimed at looking for objects in an image, comparing graphics objects, looking for similarities in two images, etc. The purpose of digital image comparison in the present invention, on the other hand, is not to find similarities in general, but to aid human software developer in analyzing the images and allow the developer to correlate the comparison result to issues in the software being developed. Thus, one object of the image comparison method of this invention is to present the comparison result in a way that facilitate visual comparison by the human developer. Another object of the present invention is to provide a method and software tools to automate the process of comparing images such that small differences that would not typically be noticeable by a human viewing a printed page may be filtered from larger differences that may reflect problems in the software under development that need to be analyzed and corrected.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a digital image comparison method useful in imaging software development, which includes: (a) generating test digital images from print data using imaging software under development; (b) generating reference digital images from the print data using reference software; (c) automatically comparing the test digital images and the reference digital images using an image comparison program executed by a computer; and (d) presenting comparison result to a human operator.

Further, step (c) includes: (c1) dividing the test digital image and the reference digital image into a plurality of test tiles and reference tiles, each test tile corresponding to a reference tile; (c2) performing a pixel-by-pixel comparison of each test tile and the corresponding reference tile; (c3) generating a difference tile representing differences between each test tile and the corresponding reference tile at least when the test tile and the reference tile are different; and (c4) storing each difference tile with the corresponding test tile and reference tile in an image file, the tiles being adjacent to each other in the image file.

In another aspect, the present invention provides a computer program product that causes a computer to perform the above method.

It is to be understood that both the foregoing general description and the following detailed description are exemplary and explanatory and are intended to provide further explanation of the invention as claimed.

DETAILED DESCRIPTION OF PREFERRED EMBODIMENTS

The present invention provides a method which uses digital image comparison for imaging software development. The method may be used for development of software for printers (such as a raster image processor or RIP). An RIP for a printer, which is the software that generates a raster image from print data in a printer language format (e.g. page description language or PDL) or other appropriate formats, is used as an example in the following descriptions.

Figure 1:
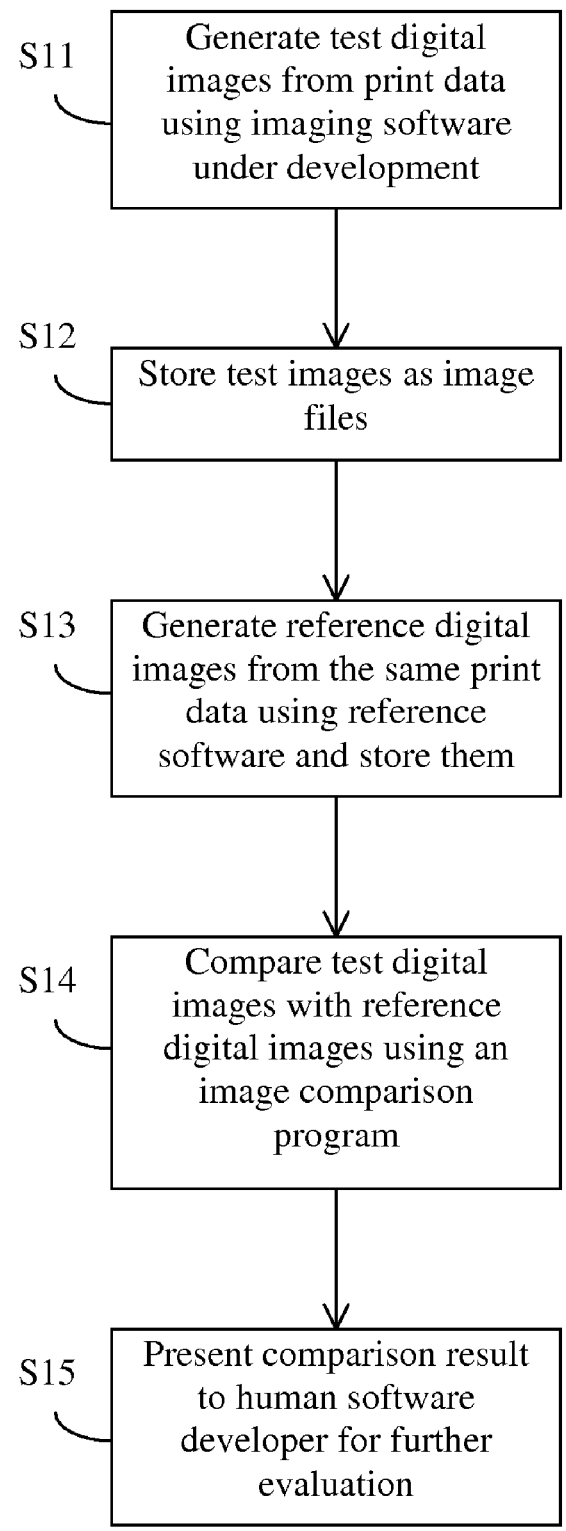
FIG. 1 is a flow diagram illustrating an evaluation method useful in imaging software development.

In an embodiment of the present invention, illustrated in FIG. 1, the RIP software under development is used to generate a set of digital images, referred to here as test images, from print data (step S11). The test images are saved as image files (step S12), such as TIFF (Tagged Image File Format) files. Unlike in the conventional method, the images are not printed by the printer. The print data is in a format such as PDL that are commonly used by an RIP. Alternatively, the print data may also be in other commonly used image format such as JPEG or a format used by an application program such as Microsoft® Word, Powerpoint®, etc., in which case an application program may be required to convert the print data to a PDL format that the RIP can accept.

Meanwhile, the software of a known-good system (a reference system) is used to generate a set of images, referred to here as reference images, based on the same print data (step S13). Then, the test images and reference images are compared using an image comparison program (step S14). The result of the comparison is presented to a human software developer for further comparison and evaluation (step S15).

The comparison result is presented in an appropriate form as will be described in more detail later. The human developer can further compare the test and reference images by viewing the test and reference images on a display screen or (less preferably) by printing them on a printing device. If the image comparison algorithm used in step S14 has adjustable parameters, the human developer may adjust such parameters and repeat step S14. The human software developer can then evaluate the software under development based on the comparison.

Many comparison algorithms may be used in the image comparison step S14. As an initial step, a simple pixel-by-pixel, or byte-by-byte comparison method may be applied, where each pixel in the test image is compared to the corresponding pixel of the corresponding reference image. Any difference found in the simple comparison step may potentially indicate an issue that may need to be examined by a human developer. In practice, however, this simple pixel-by-pixel comparison method produces too many differences between the two sets of images. This is because often some changes in the RIP software may be intentional or produce very subtle differences in output. These differences are detected by a pixel-by-pixel comparison, but not all such differences should be considered as a failed test case. For example, a small change in a halftone algorithm or font rendering algorithm in the RIP may produce hundreds of very small differences per page, but these differences are not detectable on the printed page in normal testing (by human observers) and should not be considered as errors.

Therefore, for an effective image comparison for purposes of evaluating the RIP software (i.e. step S14), embodiments of the present invention provide comparison methods that can filter the types of differences which will tend to be visible on the printed page. Multiple comparison methods may be applied in order to detect and filter different types of differences. Some of these comparison methods may have configuration parameters which may be adjusted depending on the type of test being conducted.

According to one embodiment, a score or weight is computed in order to categorize each image comparison into two or more groups. One group includes those images where the computed differences between the test and reference images are below a first predetermined threshold such that the image is considered to be "good". The second group includes those images where the computed differences are above a second predetermined threshold such that the image is considered to be "bad". A third group includes images where the computed differences are between the two thresholds. The third group may need further analysis to determine their state (i.e. "good" or "bad").

During the comparison process, and afterwards when images may be viewed to examine the differences, the size of the image data may limit the performance of the overall process. A typical CMYK TIFF image for a 1200 DPI (dot per inch) printer may be as much as 512 MB (megabytes) in size without compression. It requires considerable CPU power and RAM (internal memory) to process these large files. Therefore, the image comparison methods according to embodiments of the present invention provide ways of dealing with the data size issue. In one embodiment, each image is divided into multiple tiles and image comparison is done tile-by-tile. Preferably, the comparison results are stored in a compact format so that analyzing the detected differences (on screen or paper) is fast and efficient. In addition, the differences are presented in a compact format so that the performance issues normally encountered when viewing very large images on a computer are mitigated.

Figure 2:
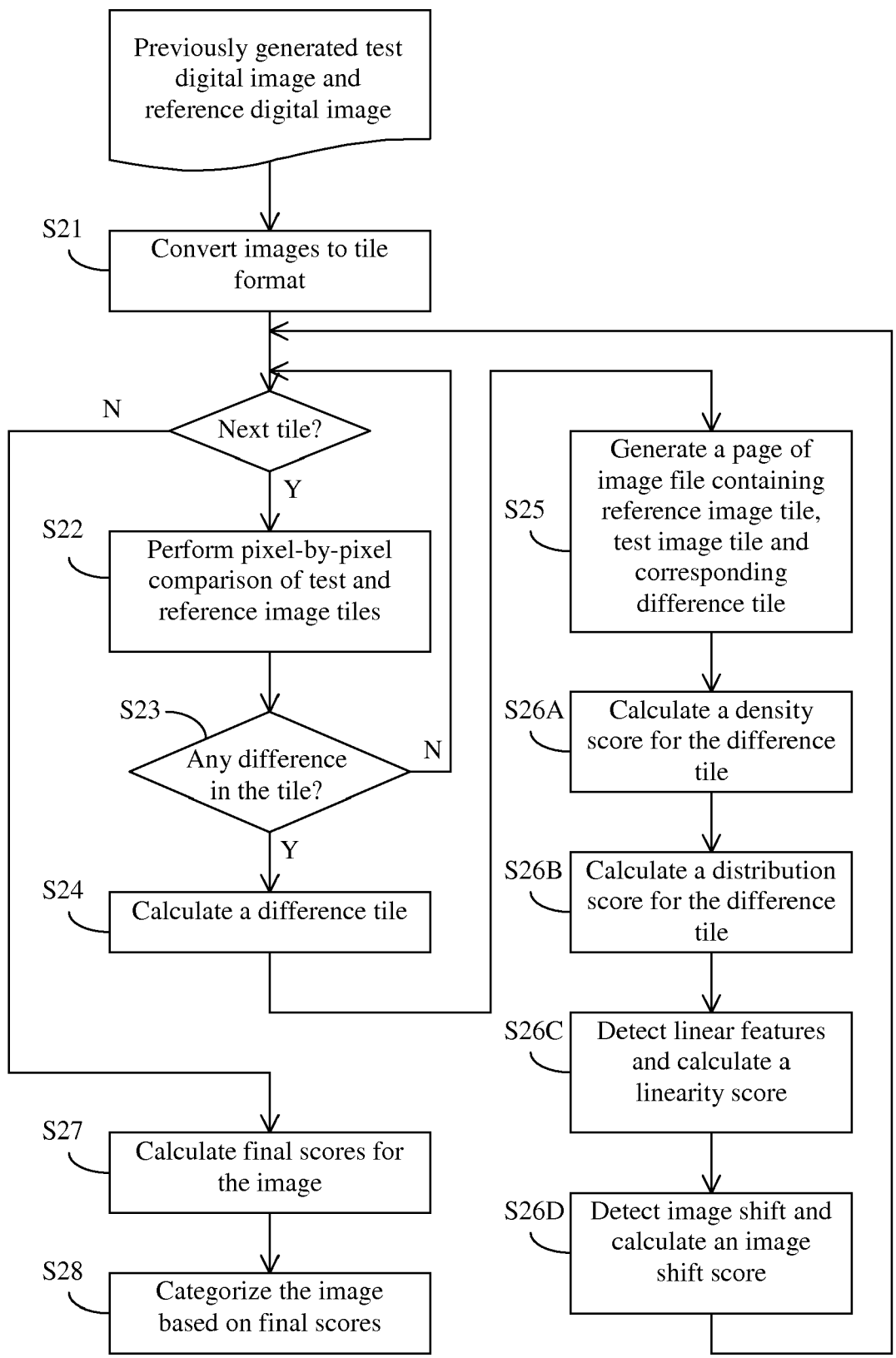
FIG. 2 is a flow diagram illustrating a digital image comparison method.

An image comparison method (step S14 in FIG. 1) is described in more detail with reference to FIG. 2. A set of test digital images and a set of reference digital images have been generated (in steps S11 and S13 of FIG. 1) and stored. Assuming the images are not already in a tiled format, each test image and reference image is converted to a tiled format (step S21), where the test image and the corresponding reference image are divided into the same tiles. For example, the open source utility "tiffcp" may be used to convert a TIFF image to a tile format. Other suitable programs may be used. The size and number of tiles per image may be adjusted. In one particular example, the tile size is 256×256 pixels. The purpose of this step is to control the size and area of each comparison to be more efficient and faster when doing later analysis steps. Then, a pixel-by-pixel comparison is performed on a tile-by-tile basis, where the pixel data in each test image tile is compared to the pixel data in the corresponding reference image tile (step S22). This process can be done very fast and is the first level of filtering (comparison may stop at the first different pixel). Any tile that has no differences is exempt from any further processing ("N" in step S23). However, this level of filtering may not eliminate very many images, as only one pixel different in only one tile may mean that the entire image may need additional examination. For each tile that has at least one pixel difference ("Y" in step S23), the following additional processing is performed.

A tile representing the difference between the test image tile and reference image tile is calculated (step S24). This tile (the difference tile) shows each pixel that is different between the test and reference image tiles. For binary images (1 bit data per pixel), step S24 may be done by applying an XOR (exclusive or) operation to each pixel and generating a new tile (the difference tile) where each pixel is the XOR of the pixels from the test image tile and the reference image tile. For images having more than 1 bit per pixel, i.e. grayscale or color images, step S24 may be implemented in a variety of ways. For example, a mask or difference bitmap may be generated, where a pixel is "dark" if the corresponding pixels in the test and reference tiles are different and "white" if they are not different. Alternatively, a mask may be generated where a pixel is "dark" if the gray level difference of the two corresponding pixels in the test and reference tiles is above a threshold. Alternatively or in addition, a multiple-level difference image may be generated. For color images (CMYK) a difference tile may be generated for each color plane, and the planes may be combined.

The difference tile, along with the test image tile and the reference image tile, are written into a file (step S25). One or more such files (referred to here as comparison image files), which may be TIFF format files, are produced by the comparison process of FIG. 2; each time step S25 is performed, the tiles may be appended in a comparison image file. Each comparison file is preferably a multi-page image file, where each page contains three tiles: a reference image tile, the corresponding test image tile, and the corresponding difference tile. The image file can later be displayed to the human software developer for evaluation.

Figure 3:
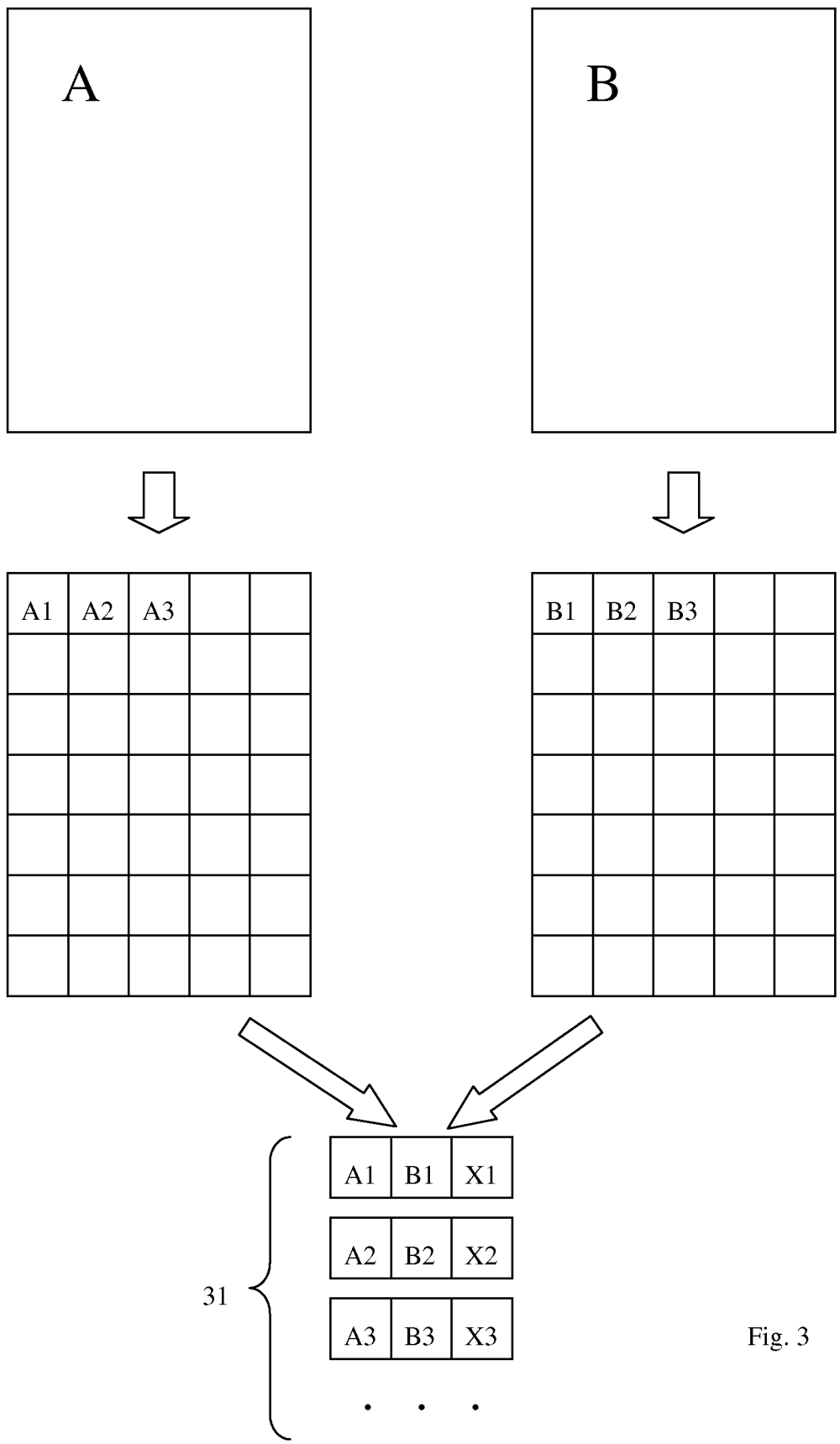
FIG. 3 schematically illustrates dividing images into tiles and presenting image comparison results tile-by-tile.
Figure 4:
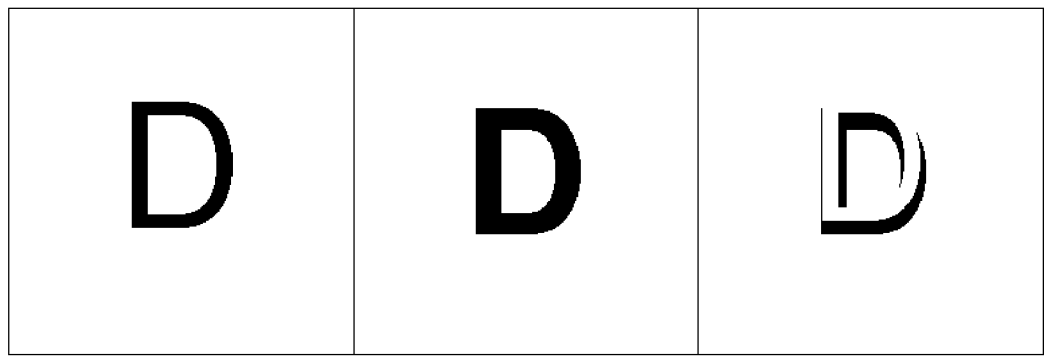
FIG. 4 illustrates an example of image comparison result that can be displayed to the user.

FIG. 3 illustrates a reference image A and a test image B. It also illustrates the reference image A being tiled into tiles A1, A2, A3, etc. and the reference image B being tiled into tiles B1, B2, B3, etc. The comparison file 31 is show as containing a first page including tiles A1, B1, X1, a second page including tiles A2, B2, X2, etc. (where X1, X2, X3, etc. are the difference tiles). Preferably, the three tiles are adjacent each other on the same page for easy comparison by the human software developer. Alternatively, in step S25, instead of producing one or more multi-page comparison files, a separate single-page comparison file may be generated for each tile containing differences. The purpose of generating the comparison files in step S25 is to output only a small area showing each difference, so that further analysis and viewing is efficient. FIG. 4 shows an example of three tiles A1, B1, X1 (binary images are used in this example).

Step S24 (calculating a difference tile) preferably includes generating statistics that describe and measure the basic differences between the test and reference images, such as how many pages have at least one difference, how many tiles per page have a difference, etc. In a fully automated approach, the comparison program performs further image comparison analyses, e.g., one or more of steps S26A to S26D described below, for each tile. After all tiles are processed, the program calculates final scores for the image and categorizes the image (e.g. good/bad) (steps S27 and S28).

Various image comparison and analysis methods may be used to analyze the differences in the images. Some examples are described below. It should be understood that other methods may be used, and new comparison methods may be developed over time to extend the system.

Density: Calculate the effective density of the difference tile X, defined as the fraction (percentage) of pixels that are different (step S26A). The higher the density score, the more likely that these differences will be significant and constitute an error in the output.

Distribution: If the difference pixels are clumped together in small areas, it is much more likely that even a low density score will reflect a significant output difference or error. Thus, a distribution score representing a degree of concentration is calculated (step S26B). In one implementation, the tile is divided into small blocks of pixels (e.g. 8 pixels) and the number of pixels that are different is computed for each small block and summed. The number of small blocks that have one or more different pixels is also computed. The Distribution score is the ratio of these two numbers. This score ranges from 1 to 8 if each small block has 8 pixels. The shape of the small blocks may a horizontal row of N (e.g. 8) pixels (in which case the calculated distribution score will tend to detect clumps that run horizontally), a vertical column of N pixels (in which case the calculated distribution score will tend to detect clumps that run vertically), or a rectangular area of N pixels (in which case the calculated distribution score will tend to detect clumps that extend in two-dimensions), etc. Alternatively, a more advanced method may calculate the distribution in multiple directions.

Linearity: A method that detects linear features such as thin lines or edges of objects may be applied to calculate a linear-feature score (step S26C). This helps detect whether an object changed in size or may be clipped in some way.

Shift: An image shift detection method that detects small (1-2 pixels) shifts between the test image tile A and the reference image tile B may be applied to calculate an image shift score (step S28). If an object or an entire page shifts by only a small amount, the simple pixel-by-pixel comparison (step S21) will result in a large difference score, but after adjusting for the small shift that score will drop dramatically. If an image shift is detected, the test image may be corrected for the shift and the other scores may be re-calculated.

After the above scores are calculated for all tiles, one or more final scores, which may be each individual score averaged over the image, or one or more combined scores that measures the overall amount of image differences, are calculated for the image (step S27). The final scores are compared with predetermined thresholds to categorize the image (step S28). The image may be categorized as "good" or "bad", or an intermediate category may be used for images that fall between "good" and "bad" and need additional analysis. The categorization may be based on all scores, or on individual scores (e.g. an image may be "good" for one score and "bad" for another score). The categories may be defined in any desired way. In one example, one threshold value is defined for each score, and an image is considered "good" if all scores are below the respective thresholds, considered "bad" if all scores are above the respective thresholds, and "in between" if some scores are above and some scores are below the respective thresholds.

As pointed out above, in an automated approach, the image analysis steps S26A to S26D are performed automatically, with a set of pre-set parameters if the analysis algorithm employs parameters. Alternatively, when submitting the program for execution, the operator may specify which of the steps S26A to S26D are to be automatically performed. As another alternative, the program may process all tiles, performing step S25 to generate the comparison image files, but without performing steps S26A to S26D. Then, the program may pause and give the operator an opportunity to examine the difference image tiles visually. The operator may then choose to instruct the program to perform one or more of the image analysis steps S26A to S26D.

The various steps of the method of FIG. 1, including steps S11, S13 and S14, may be carried out by a general-purpose computer.

The automated method for performing image comparison during software development described above has many advantages over the traditional methods of printing each image on paper and comparing them manually. A main advantage is the time and cost (resource) savings. Specifically, image generation (steps S11 and S13 in FIG. 1) can be done unattended (e.g. over night) and does not require printer hardware, paper, toner or other consumables. Image comparison (step S14 in FIG. 1, and FIG. 2) can also be run unattended and a human operator is notified of the results when the comparison is completed. A human operator only needs to examine those images where the difference was above predetermined thresholds; the operator does not need to examine each image one-by-one. The comparison result is stored in a format that allows the operator to examine only the portion(s) of the images that are different, rather than the entire image, saving additional time.

Another main advantage is that various comparison algorithms may be used to evaluate image differences to determine whether each difference should be considered as an error or not. Such algorithms may be extensible and/or configurable to suit different test scenarios or conditions, and may be carried out in an interactive manner.

The automated image comparison method also increase overall performance during software development, as it will be typically as fast or faster to compare two images via the automated method as it is to compare them manually via printed images.

It will be apparent to those skilled in the art that various modification and variations can be made in the digital image comparison method of the present invention without departing from the spirit or scope of the invention. Thus, it is intended that the present invention cover modifications and variations that come within the scope of the appended claims and their equivalents.

What is claimed is:
1. A digital image comparison method useful in imaging software development, comprising:
(a) generating test digital images from print data using imaging software under development;

(b) generating reference digital images from the print data using reference software;
(c) automatically comparing the test digital images and the reference digital images using an image comparison program executed by a computer; and
(d) presenting comparison result to a human operator, wherein the step (c) comprises:
(c1) dividing the test digital image and the reference digital image into a plurality of test tiles and reference tiles, each test tile corresponding to a reference tile;
(c2) performing a pixel-by-pixel comparison of each test tile and the corresponding reference tile;
(c3) generating a difference tile representing differences between each test tile and the corresponding reference tile at least when the test tile and the reference tile are different, wherein the difference tile is an image that consists of pixels each of which represents a difference between a corresponding pixel of the test tile and a corresponding pixel of the reference; and
(c4) storing each difference tile with the corresponding test tile and reference tile in an image file, wherein all of the test tile, the reference tile and the difference tile are being presented in a state of individual tiles each divided from an original entire image and laid-out adjacent to each other in a page of the image file.

2. The method of claim 1, further comprising:
(e) storing the test digital images as image files.

3. The method of claim 1, wherein step (d) comprises displaying the image file on a display screen.

4. The method of claim 1, wherein step (c) further comprises:
(c5) calculating one or more difference scores for each difference tile, each difference score representing a measure of differences between the test tile and the reference tile;
(c6) calculating one or more difference scores for the test image from the difference scores for the difference tiles; and
(c7) categorizing the test image based on the one or more difference scores for the test image.

5. The method of claim 4, wherein one of the difference scores is a density score representing a measure of a fraction of pixels in the difference tile that are different.

6. The method of claim 4, wherein one of the difference scores is a distribution score representing a degree of concentration of pixels that are different.

7. The method of claim 4, wherein one of the difference scores is a linear-feature score representing an amount of linear features in the difference tile including thin lines and edges of objects.

8. The method of claim 4, wherein one of the difference scores is an image shift score representing a shift between the test image and the reference image.

9. The method of claim 4, wherein step (c5) includes receiving an instruction specifying one or more differences scores to be calculated, receiving an instruction setting one or more parameters for the calculations, and calculating the specified difference scores using the set parameters.

10. A computer program product comprising a non-transitory computer usable medium having a computer readable program code embedded therein for controlling a computer, the computer readable program code configured to cause the computer to execute a digital image comparison method, the process comprising:

(a) generating test digital images from print data using imaging software under development;
(b) generating reference digital images from the print data using reference software;
(c) automatically comparing the test digital images and the reference digital images using an image comparison program executed by a computer; and
(d) presenting comparison result to a human operator, wherein the step (c) comprises:
(c1) dividing the test digital image and the reference digital image into a plurality of test tiles and reference tiles, each test tile corresponding to a reference tile;
(c2) performing a pixel-by-pixel comparison of each test tile and the corresponding reference tile;
(c3) generating a difference tile representing differences between each test tile and the corresponding reference tile at least when the test tile and the reference tile are different, wherein the difference tile is an image that consists of pixels each of which represents a difference between a corresponding pixel of the test tile and a corresponding pixel of the reference; and
(c4) storing each difference tile with the corresponding test tile and reference tile in an image file, wherein all of the test tile, the reference tile and the difference tile are being presented in a state of individual tiles each divided from an original entire image and laid-out adjacent to each other in a page of the image file.

11. The computer program product of claim 10, wherein the method further comprises storing the test digital images as image files.

12. The computer program product of claim 10, wherein step (d) comprises displaying the image file on a display screen.

13. The computer program product of claim 10, wherein step (c) further comprises:
(c5) calculating one or more difference scores for each difference tile, each difference score representing a measure of differences between the test tile and the reference tile;
(c6) calculating one or more difference scores for the test image from the difference scores for the difference tiles; and
(c7) categorizing the test image based on the one or more difference scores for the test image.

14. The computer program product of claim 13, wherein one of the difference scores is a density score representing a measure of a fraction of pixels in the difference tile that are different.

15. The computer program product of claim 13, wherein one of the difference scores is a distribution score representing a degree of concentration of pixels that are different.

16. The computer program product of claim 13, wherein one of the difference scores is a linear-feature score representing an amount of linear features in the difference tile including thin lines and edges of objects.

17. The computer program product of claim 13, wherein one of the difference scores is an image shift score representing a shift between the test image and the reference image.

18. The computer program product of claim 13, wherein step (c5) includes receiving an instruction specifying one or more differences scores to be calculated, receiving an instruction setting one or more parameters for the calculations, and calculating the specified difference scores using the set parameters.

* * * * *